United States Patent
Takashima et al.

(10) Patent No.: US 12,503,127 B2
(45) Date of Patent: *Dec. 23, 2025

(54) REMOTE OPERATION METHOD, REMOTE OPERATION DEVICE, AND NON-TRANSITORY COMPUTER-READABLE RECORDING MEDIUM

(71) Applicant: TOYOTA JIDOSHA KABUSHIKI KAISHA, Toyota (JP)

(72) Inventors: Toru Takashima, Susono (JP); Sho Otaki, Yokohama (JP); Hiromitsu Urano, Numazu (JP); Hojung Jung, Shizuoka-ken (JP); Hiromitsu Kobayashi, Nisshin (JP); Satoru Niwa, Shizuoka-ken (JP); Kosuke Akatsuka, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

This patent is subject to a terminal disclaimer.

(21) Appl. No.: 18/240,747

(22) Filed: Aug. 31, 2023

(65) Prior Publication Data
US 2023/0406334 A1 Dec. 21, 2023

Related U.S. Application Data

(63) Continuation of application No. 17/584,509, filed on Jan. 26, 2022, now Pat. No. 11,780,454.

(30) Foreign Application Priority Data

Mar. 23, 2021 (JP) .................................. 2021-049109

(51) Int. Cl.
B60W 50/10 (2012.01)
G05D 1/00 (2024.01)

(52) U.S. Cl.
CPC ........... *B60W 50/10* (2013.01); *G05D 1/0016* (2013.01); *B60W 2556/45* (2020.02)

(58) Field of Classification Search
CPC . B60W 50/10; B60W 2556/45; G05D 1/0016
See application file for complete search history.

(56) References Cited

U.S. PATENT DOCUMENTS 10,437,242 B2 * 10/2019 Tokura .................. G05B 15/02
2019/0146485 A1    5/2019 Yoneda
(Continued)

FOREIGN PATENT DOCUMENTS

JP         2020-155936 A       9/2020

OTHER PUBLICATIONS

Notice of Allowance mailed Jun. 5, 2023, in U.S. Appl. No. 17/584,509.

*Primary Examiner* — Tarek Elarabi
(74) *Attorney, Agent, or Firm* — Sughrue Mion, PLLC

(57) ABSTRACT

A vehicle is operated in accordance with a second operation amount corresponding to a first operation amount of a remote operation member by an operator. A first maximum operation range is a maximum operation range of the remote operation member. A second maximum operation range is a maximum operation range of an operation member of the vehicle. When the first maximum operation range is smaller than the second maximum operation range, a correspondence relationship between the first and second operation amounts is adjusted such that the second operation amount becomes larger than the first operation amount. When the first maximum operation range is larger than the second maximum operation range, an operable range of the remote operation member is restricted or the correspondence relationship is adjusted such that the second operation amount becomes smaller than the first operation amount.

2 Claims, 12 Drawing Sheets

(56) References Cited

U.S. PATENT DOCUMENTS

| | | | |
|---|---|---|---|
| 2019/0179302 A1* | 6/2019 | Tokura | ........... G05B 15/02 |
| 2022/0306136 A1 | 9/2022 | Takashima | |

* cited by examiner

REMOTE OPERATION METHOD, REMOTE OPERATION DEVICE, AND NON-TRANSITORY COMPUTER-READABLE RECORDING MEDIUM

CROSS-REFERENCE TO RELATED APPLICATION

This application is a continuation of U.S. application Ser. No. 17/584,509, filed on Jan. 26, 2022 (allowed), which claims priority to Japanese Patent Application No. 2021-049109 filed on Mar. 23, 2021, the entire contents of which are incorporated by reference herein.

BACKGROUND

Technical Field

The present disclosure relates to a technique of remotely operating a vehicle in accordance with an operation of a remote operation member by an operator.

Background Art

Patent Literature 1 discloses a remote driving system that remotely operates a steering of an automated driving vehicle. The remote driving system acquires a steering angle of the steering from the automated driving vehicle. Moreover, the remote driving system detects a difference between the steering angle of the steering of the automated driving vehicle and a steering angle of a steering of a remote controller. Then, the remote driving system applies a steering resistive force according to the difference in the steering angle to the steering of the remote controller.

LIST OF RELATED ART

Patent Literature 1: Japanese Laid-Open Patent Application Publication No. JP-2020-155936

SUMMARY

Remotely operating a vehicle in accordance with an operation of a remote operation member by an operator is considered. Regarding the vehicle being a target of the remote operation, there are various types with different sizes, equipments, and the like. The operator needs to handle the various types of vehicles by using the same remote operation member. Here, a maximum operation range of the remote operation member and a maximum operation range on the vehicle side do not necessarily match with each other. In a situation where the maximum operation range of the remote operation member and the maximum operation range on the vehicle side do not match with each other, there is a possibility that remote operability is deteriorated.

An object of the present disclosure is to provide a technique capable of securing an appropriate remote operability when remotely operating a vehicle in accordance with an operation of a remote operation member by an operator.

A first aspect is directed to a remote operation method that remotely operates a vehicle in accordance with an operation of a remote operation member by an operator.

A first operation amount is an operation amount of the remote operation member by the operator.

A first maximum operation range is a maximum operation range of the remote operation member.

A second maximum operation range is a maximum operation range of an operation member of the vehicle.

The remote operation method includes:
  operating the vehicle in accordance with a second operation amount corresponding to the first operation amount;
  a first adjustment process that, when the first maximum operation range is smaller than the second maximum operation range, adjusts a correspondence relationship between the first operation amount and the second operation amount such that the second operation amount becomes larger than the first operation amount; and
  a second adjustment process that, when the first maximum operation range is larger than the second maximum operation range, restricts an operable range of the remote operation member to a restricted operation range smaller than the first maximum operation range or adjusts the correspondence relationship between the first operation amount and the second operation amount such that the second operation amount becomes smaller than the first operation amount.

A second aspect is directed to a remote operation device that remotely operates a vehicle in accordance with an operation of a remote operation member by an operator.

A first operation amount is an operation amount of the remote operation member by the operator.

A first maximum operation range is a maximum operation range of the remote operation member.

A second maximum operation range is a maximum operation range of an operation member of the vehicle.

The remote operation device includes one or more processors.

The one or more processors are programmed to execute:
  transmitting information of a second operation amount corresponding to the first operation amount to the vehicle via communication, wherein the vehicle is operated in accordance with the second operation amount;
  a first adjustment process that, when the first maximum operation range is smaller than the second maximum operation range, adjusts a correspondence relationship between the first operation amount and the second operation amount such that the second operation amount becomes larger than the first operation amount; and
  a second adjustment process that, when the first maximum operation range is larger than the second maximum operation range, restricts an operable range of the remote operation member to a restricted operation range smaller than the first maximum operation range or adjusts the correspondence relationship between the first operation amount and the second operation amount such that the second operation amount becomes smaller than the first operation amount.

A third aspect is directed to a remote operation program that remotely operates a vehicle in accordance with an operation of a remote operation member by an operator.

A first operation amount is an operation amount of the remote operation member by the operator.

A first maximum operation range is a maximum operation range of the remote operation member.

A second maximum operation range is a maximum operation range of an operation member of the vehicle.

The remote operation program, when executed by a computer, causes the computer to execute:

transmitting information of a second operation amount corresponding to the first operation amount to the vehicle via communication, wherein the vehicle is operated in accordance with the second operation amount;

a first adjustment process that, when the first maximum operation range is smaller than the second maximum operation range, adjusts a correspondence relationship between the first operation amount and the second operation amount such that the second operation amount becomes larger than the first operation amount; and a second adjustment process that, when the first maximum operation range is larger than the second maximum operation range, restricts an operable range of the remote operation member to a restricted operation range smaller than the first maximum operation range or adjusts the correspondence relationship between the first operation amount and the second operation amount such that the second operation amount becomes smaller than the first operation amount.

According to the present disclosure, when the first maximum operation range is smaller than the second maximum operation range, the first adjustment process is performed. On the other hand, when the first maximum operation range is larger than the second maximum operation range, the second adjustment process is performed. The first adjustment process or the second adjustment process makes it possible to secure an appropriate remote operability even in the situation where the first maximum operation range and the second maximum operation range do not match with each other. That is, it is possible to secure the appropriate remote operability regardless of a type of the vehicle.

EMBODIMENTS

Embodiments of the present disclosure will be described below with reference to the attached drawings.

1. Outline of Remote Operation System

Figure 1:
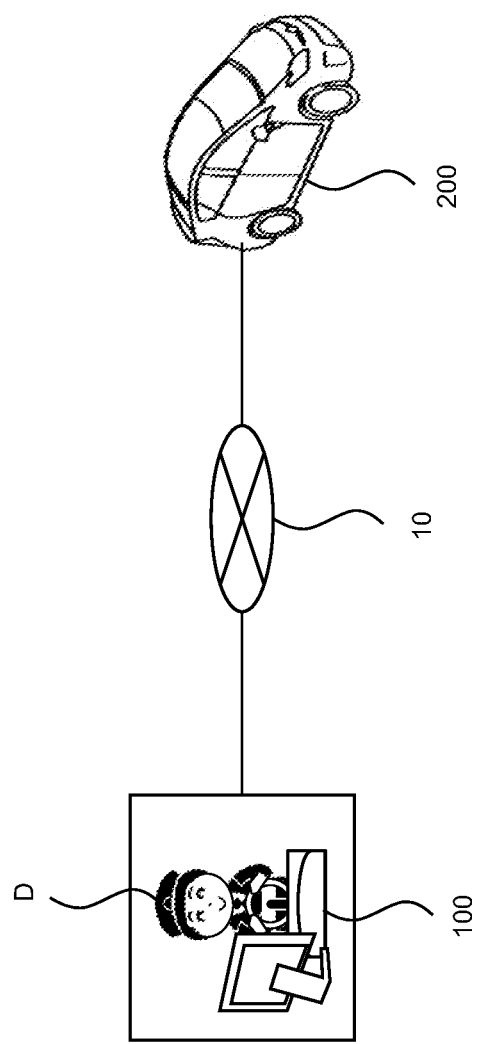
FIG. 1 is a conceptual diagram for explaining an outline of a remote operation system according to an embodiment of the present disclosure.

FIG. 1 is a conceptual diagram for explaining an outline of a remote operation system 1 according to the present embodiment. The remote operation system 1 includes a remote operation device 100 and a vehicle 200 that is a target of the remote operation (remote driving). The remote operation device 100 is a device for remotely operating the vehicle 200 and is used by an operator D. The remote operation device 100 and the vehicle 200 are communicably connected to each other via a wireless communication network 10. The wireless communication network 10 is, for example, a 5G network.

Figure 2:
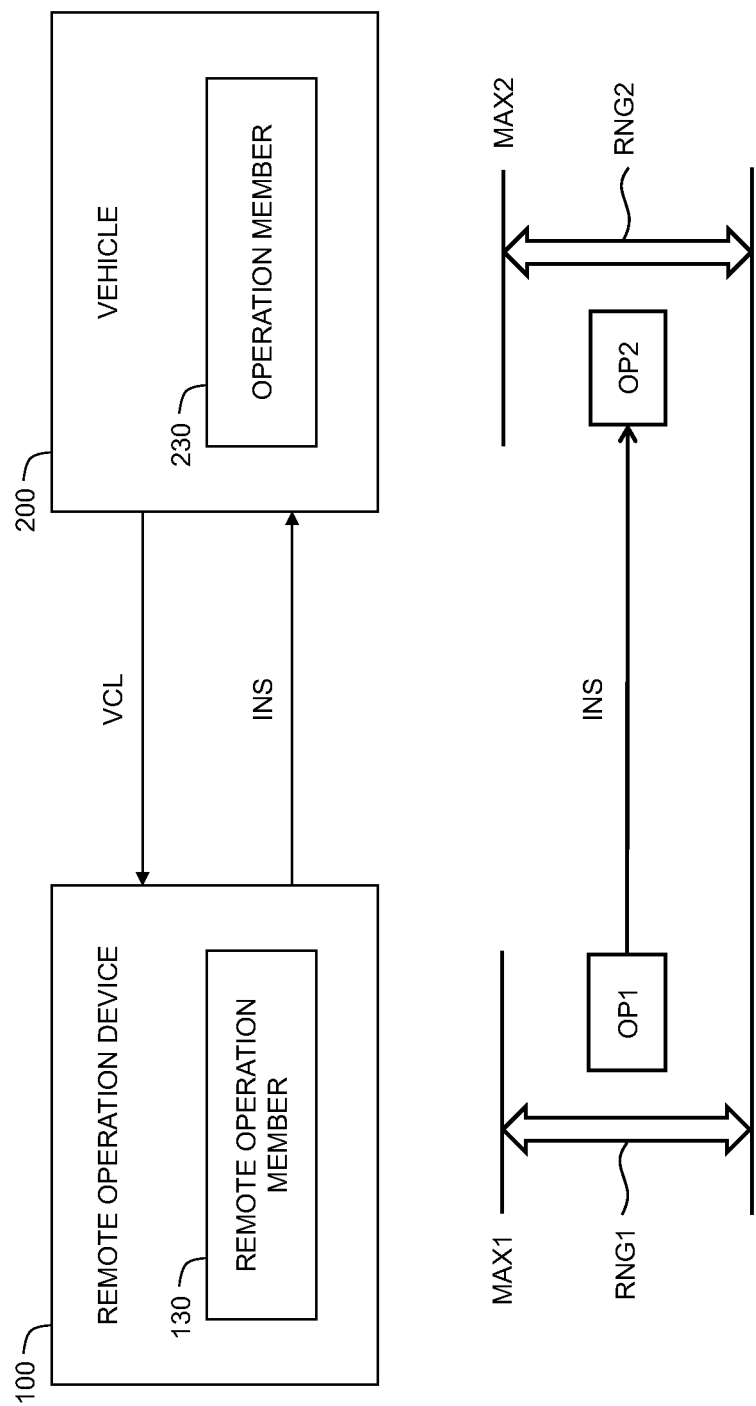
FIG. 2 is a conceptual diagram for explaining an outline of a remote operation of a vehicle according to an embodiment of the present disclosure.

FIG. 2 is a conceptual diagram for explaining an outline of a remote operation of the vehicle 200. The vehicle 200 transmits vehicle information VCL indicating a vehicle state and a surrounding situation to the remote operation device 100 via the wireless communication network 10. The remote operation device 100 receives the vehicle information VCL from the vehicle 200 and presents the received vehicle information VCL to the operator D. The operator D performs the remote operation of the vehicle 200 by referring to the vehicle information VCL.

More specifically, the remote operation device 100 is provided with a remote operation member 130. The remote operation member 130 is a member operated by the operator D when remotely operating the vehicle 200. The remote operation member 130 includes at least one of a steering wheel, an accelerator pedal, and a brake pedal. An operation amount of the remote operation member 130 by the operator D is hereinafter referred to as a "first operation amount OP1", for the purpose of convenience. It should be noted that the operation amount of the steering wheel is a steering angle (steering wheel angle), and the operation amount of each of the accelerator pedal and the brake pedal is a stroke amount.

The first operation amount OP1 of the remote operation member 130 represents an intention of the operator D. The remote operation device 100 transmits "operation instruction information INS", in which the first operation amount OP1 is reflected, to the vehicle 200 via the wireless communication network 10. For example, the operation instruction information INS indicates the first operation amount OP1 itself. Alternatively, the operation instruction information INS may indicate a corrected operation amount obtained by correcting the first operation amount OP1. In any case, the intention of the operator D is reflected in the operation instruction information INS.

The vehicle 200 receives the operation instruction information INS from the remote operation device 100. An operation amount indicated by the operation instruction information INS received from the remote operation device 100 is hereinafter referred to as a "second operation amount OP2", for the purpose of convenience. A control device of the vehicle 200 performs an operation (at least one of steering, driving, and braking) of the vehicle 200 in accordance with the second operation amount OP2. When the second operation amount OP2 includes a steering angle of the steering wheel, the control device steers the vehicle 200 in accordance with the steering angle. When the second operation amount OP2 includes a stroke amount of the accelerator pedal, the control device drives the vehicle 200 in accordance with the stroke amount. When the second operation amount OP2 includes a stroke amount of the brake pedal, the control device brakes the vehicle 200 in accordance with the stroke amount.

As described above, the remote operation system 1 operates the vehicle 200 in accordance with the second operation amount OP2 corresponding to the first operation amount OP1 of the remote operation member 130 by the operator D. That is, the remote operation system 1 remotely operates the vehicle 200 in accordance with the operation of the remote operation member 130 by the operator D.

It should be noted that the vehicle 200 is provided with an operation member 230 including a steering wheel, an accelerator pedal, and a brake pedal. A driver of the vehicle 200 can operate (drive) the vehicle 200 by operating the operation member 230. In a case of manual driving, the control device of the vehicle 200 operates the vehicle 200 in accordance with an operation amount of the operation member 230 by the driver. On the other hand, in a case of the remote operation (remote driving), the control device of the vehicle 200 operates the vehicle 200 in accordance with the second operation amount OP2 indicated by the operation instruction information INS described above. The vehicle 200 may be able to switch the manual driving and automated driving. The remote operation of the vehicle 200 may be performed for assisting the automated driving of the vehicle 200.

2. Operability Adjustment Process

Hereinafter, operation ranges of the remote operation member 130 of the remote operation device 100 and the operation member 230 of the vehicle 200 are considered. A "first maximum operation range RNG1" is a maximum operation range of the remote operation member 130 of the remote operating device 100. A "first maximum operation amount MAX1" is a maximum operation amount in the first maximum operation range RNG1. The first maximum operation range RNG1 is a range from 0 to the first maximum operation amount MAX1. A "second maximum operation range RNG2" is a maximum operation range of the operation member 230 of the vehicle 200. A "second maximum operation amount MAX2" is a maximum operation amount in the second maximum operation range RNG2. The second maximum operation range RNG2 is a range from 0 to the second maximum operation amount MAX2.

Regarding the vehicle 200 being the target of the remote operation, there are various types with different sizes, equipments, and the like. The operator D needs to handle the various types of vehicles 200 by using the same remote operation member 130. Here, although the second maximum operation range RNG2 on the side of the vehicle 200 may differ for each vehicle 200, the first maximum operation range RNG1 of the remote operation member 130 is constant. Therefore, the first maximum operation range RNG1 and the second maximum operation range RNG2 do not necessarily match (coincide) with each other. In a situation where the first maximum operation range RNG1 and the second maximum operation range RNG2 do not match with each other, there is a possibility that remote operability of the vehicle 200 is deteriorated.

Examples of the deterioration in remote operability are as follows. Here, the second operation amount OP2 used for operating the vehicle 200 is assumed to be the same as the first operation amount OP1 of the remote operation member 130 by the operator D. For example, in a case where the first maximum operation range RNG1 is smaller than the second maximum operation range RNG2 (i.e., RNG1<RNG2), the second operation amount OP2 on the side of the vehicle 200 does not reach the second maximum operation amount MAX2 even when the operator D operates the remote operation member 130 to the first maximum operation amount MAX1. This means that the operator D cannot remotely operate the vehicle 200 as intended. As another example, in a case where the first maximum operation range RNG1 is larger than the second maximum operation range RNG2 (i.e., RNG2>RNG1), the operation by the operator D in some operation range is not reflected in the operation of the vehicle 200. In other words, a situation in which the vehicle 200 does not react to the operation by the operator D occurs.

As described above, in the situation where the first maximum operation range RNG1 and the second maximum operation range RNG2 do not match with each other, there is a possibility that the remote operability of the vehicle 200 is deteriorated. In view of the above, the present disclosure provides a technique capable of securing an appropriate remote operability even in the situation where the first maximum operation range RNG1 and the second maximum operation range RNG2 do not match with each other. That is, the present disclosure provides a technique capable of securing an appropriate remote operability regardless of the type of the vehicle 200.

When the first maximum operation range RNG1 and the second maximum operation range RNG2 do not match with each other, the remote operation device 100 according to the present embodiment executes an "operability adjustment process" in order to secure an appropriate remote operability. For example, the remote operation device 100 executes the operability adjustment process before starting the remote operation of the vehicle 200. Hereinafter, a specific example of the operability adjustment process will be described.

2-1. First Adjustment Process

First, a case where the first maximum operation range RNG1 is smaller than the second maximum operation range RNG2 and the first maximum operation amount MAX1 is smaller than the second maximum operation amount MAX2 (i.e., RNG1<RNG2, MAX1<MAX2) is considered. The operability adjustment process in the case where the first maximum operation range RNG1 is smaller than the second maximum operation range RNG2 is hereinafter referred to as a "first adjustment process."

Figure 3:
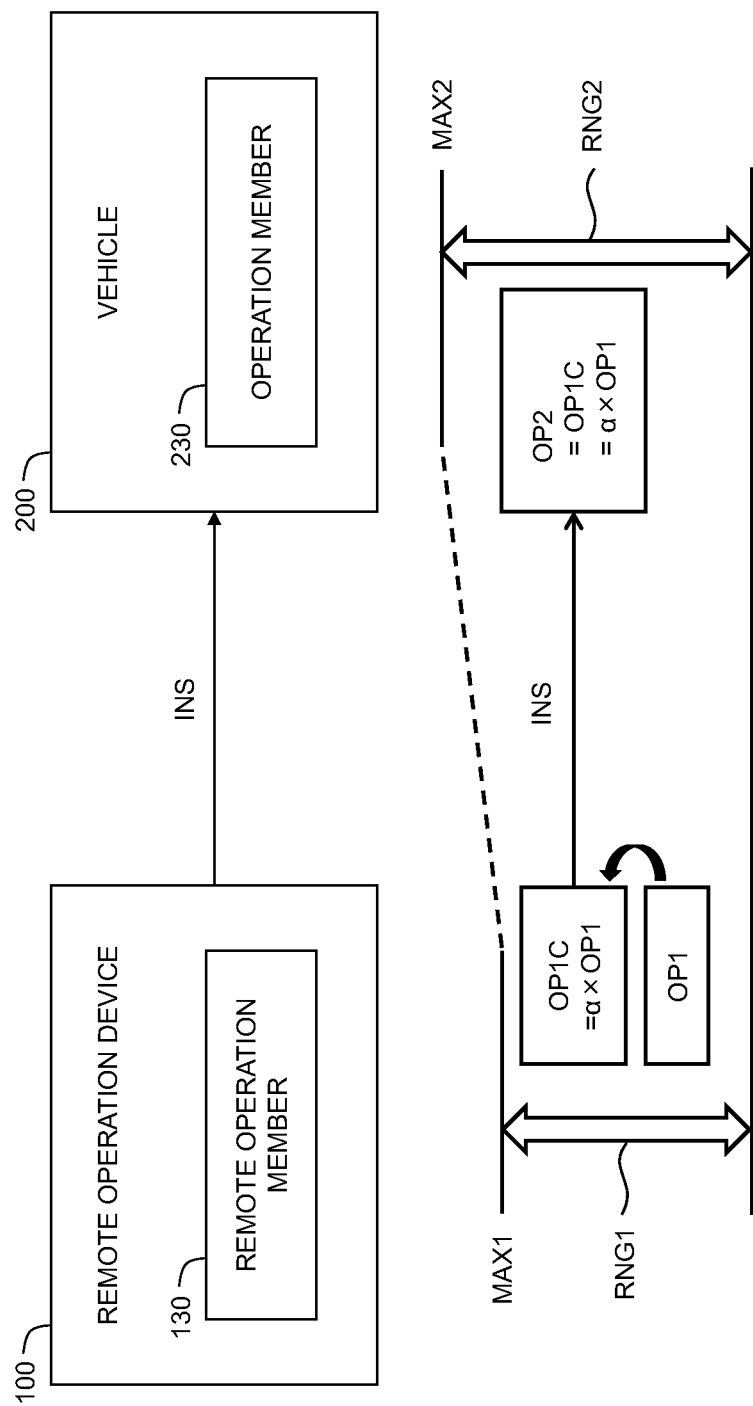
FIG. 3 is a conceptual diagram for explaining an example of a first adjustment process according to an embodiment of the present disclosure.

FIG. 3 is a conceptual diagram for explaining an example of the first adjustment process. In the first adjustment process, the remote operation device 100 adjusts a correspondence relationship between the first operation amount OP1 and the second operation amount OP2. More specifically, the remote operation device 100 adjusts the correspondence relationship between the first operation amount OP1 and the second operation amount OP2 such that the second operation amount OP2 becomes larger than the first operation amount OP1. This means that the vehicle 200 is largely operated with a small operation of the remote operation member 130. In other words, sensitivity of the vehicle 200 with respect to the operation of the remote operation member 130 is increased.

For example, the remote operation device 100 calculates a "corrected first operation amount OP1C" by multiplying the first operation amount OP1 of the remote operation member 130 by a correction coefficient α. The correction coefficient α is larger than 1 (i.e., α>1), and the corrected first operation amount OP1C is larger than the first operation amount OP1 (i.e., OP1C>OP1). The corrected first operation amount OP1C is used as the second operation amount OP2. The remote operation device 100 transmits the operation instruction information INS indicating the corrected first operation amount OP1C as the second operation amount OP2 to the vehicle 200.

Figure 4:
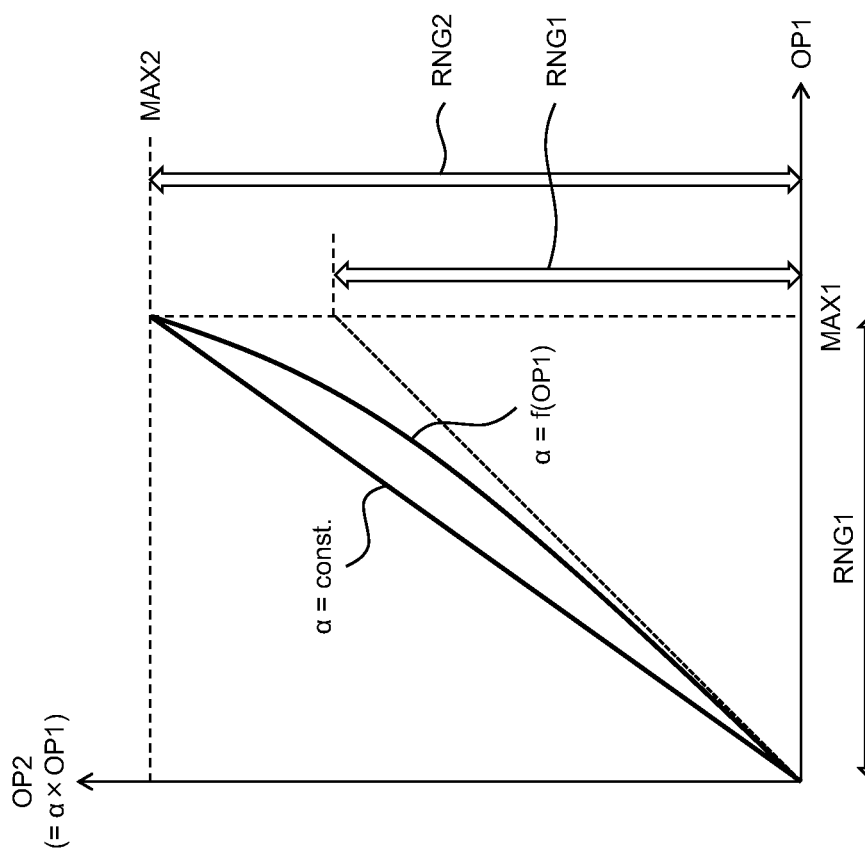
FIG. 4 is a conceptual diagram showing an example of adjustment of a correspondence relationship between a first operation amount and a second operation amount according to an embodiment of the present disclosure.

FIG. 4 is a conceptual diagram showing an example of adjustment of the correspondence relationship between the first operation amount OP1 and the second operation amount OP2. A horizontal axis represents the first operation amount OP1, and a vertical axis represents the second operation amount OP2 (i.e., OP1C=α×OP1). As shown in FIG. 4, the second operation amount OP2 is adjusted to be larger than the first operation amount OP1 due to the use of the correction coefficient α. The correction coefficient α may be a constant value or may be expressed by a function of the first operation amount OP1 (i.e., f(OP1)). That is, the correspondence relationship between the first operation amount OP1 and the second operation amount OP2 can be linear or non-linear.

In the example shown in FIG. 4, when the first operation amount OP1 is the first maximum operation amount MAX1, the second operation amount OP2 is equal to the second maximum operation amount MAX2. That is, the correspondence relationship between the first operation amount OP1 and the second operation amount OP2 is adjusted such that the second operation amount OP2 (=α×MAX1) corresponding to the first maximum operation amount MAX1 is equal to the second maximum operation amount MAX2. In this case, the first maximum operation range RNG1 and the second maximum operation range RNG2 are associated with each other in a one-to-one manner. By operating the remote operation member 130 in the first maximum operation range RNG1, the entire second maximum operation range RNG2 is reproduced on the side of the vehicle 200.

As described above, when the first maximum operation range RNG1 is smaller than the second maximum operation range RNG2, the correspondence relationship between the first operation amount OP1 and the second operation amount OP2 is adjusted such that the second operation amount OP2 becomes larger than the first operation amount OP1. This means that the vehicle 200 is largely operated with a small operation of the remote operation member 130. Therefore, an operation range larger than the first maximum operation range RNG1 and closer to the second maximum operation range RNG2 is reproduced on the side of the vehicle 200. That is, a shortage of the first maximum operation range RNG1 with respect to the second maximum operation range RNG2 is compensated. As a result, a more appropriate remote operability is secured as compared with a case where the first adjustment process is not performed.

In particular, the corresponding relationship between the first operation amount OP1 and the second operation amount OP2 may be adjusted such that the second operation amount OP2 (=α×MAX1) corresponding to the first maximum operation amount MAX1 is equal to the second maximum operation amount MAX2. In this case, the first maximum operation range RNG1 and the second maximum operation range RNG2 are associated with each other in a one-to-one manner. The entire second maximum operation range RNG2 is reproduced on the side of the vehicle 200 side, and thus a further appropriate remote operability is secured.

2-2. Second Adjustment Process

Next, a case where the first maximum operation range RNG1 is larger than the second maximum operation range RNG2 and the first maximum operation amount MAX1 is larger than the second maximum operation amount MAX2 (i.e., RNG1>RNG2, MAX1>MAX2) is considered. The operability adjustment process in the case where the first maximum operation range RNG1 is larger than the second maximum operation range RNG2 is hereinafter referred to as a "second adjustment process."

2-2-1. First Example

Figure 5:
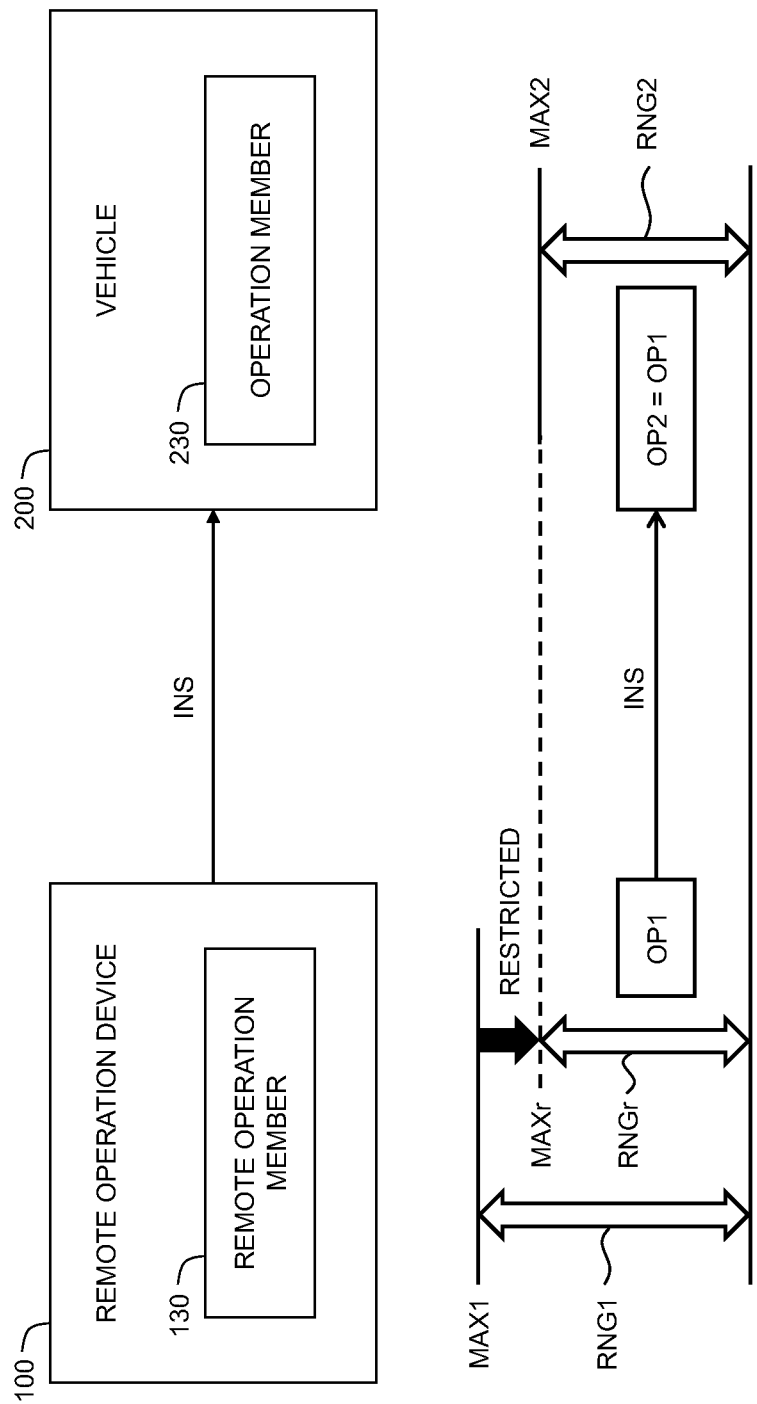
FIG. 5 is a conceptual diagram for explaining a first example of a second adjustment process according to an embodiment of the present disclosure.

FIG. 5 is a conceptual diagram for explaining a first example of the second adjustment process. In the second adjustment process, the remote operation device 100 restricts (limits) an operable range of the remote operation member 130 to a "restricted operation range RNGr" smaller than the first maximum operation range RNG1. That is, the remote operation device 100 reduces the operable range of the remote operation member 130 from the first maximum operation range RNG1 to the restricted operation range RNGr.

A restricted maximum operation amount MAXr is a maximum operation amount in the restricted operation range RNGr and is smaller than the first maximum operation amount MAX1. As shown in FIG. 5, the restricted operation range RNGr (the restricted maximum operation amount MAXr) may be set such that the second operation amount OP2 corresponding to the restricted maximum operation amount MAXr is equal to the second maximum operation amount MAX2. For example, when the first operation amount OP1 itself is used as the second operation amount OP2, the restricted maximum operation amount MAXr is set to be equal to the second maximum operation amount MAX2. Thus, the restricted operation range RNGr and the second maximum operation range RNG2 are associated with each other in a one-to-one manner.

Figure 6:
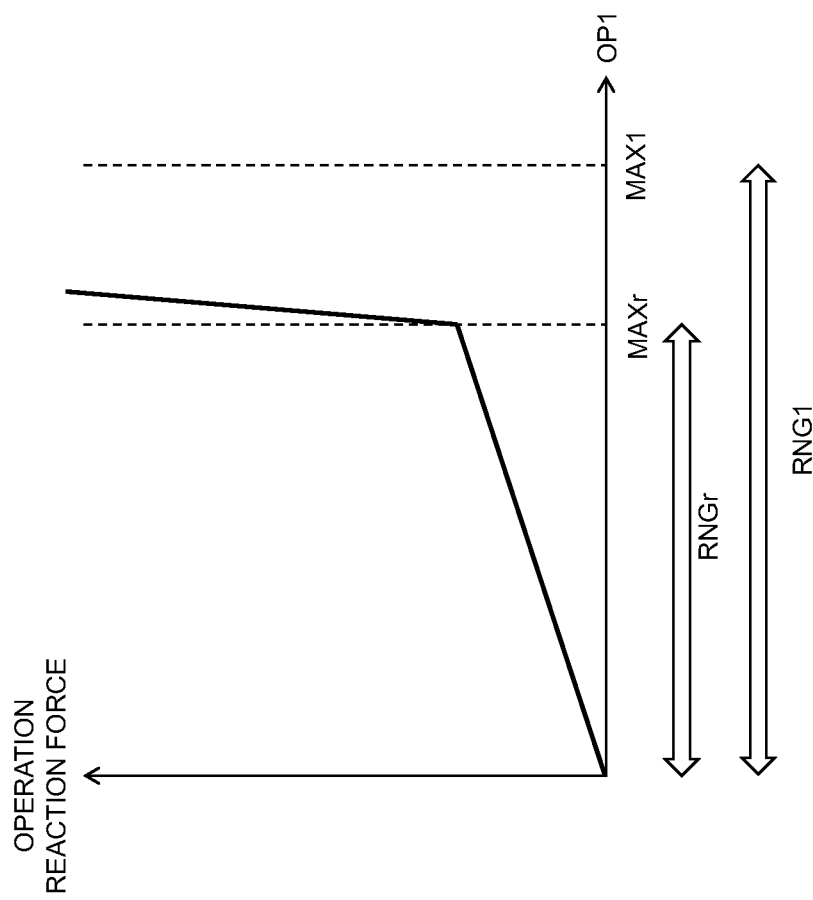
FIG. 6 is a conceptual diagram for explaining an example of a method of restricting an operable range of a remote operation member according to an embodiment of the present disclosure.

FIG. 6 is a conceptual diagram for explaining an example of a method of restricting the operable range of the remote operation member 130. A horizontal axis represents the first operation amount OP1 of the remote operation member 130, and a vertical axis represents an operation reaction force applied to the remote operation member 130. The operation reaction force (e.g., a steering reaction force) is a force acting in a direction hindering the operation of the remote operation member 130. The operation reaction force is applied to the remote operation member 130 by a reaction force generation device. As shown in FIG. 6, when the first operation amount OP1 of the remote operation amount 130 exceeds the restricted maximum operation amount MAXr, the operation reaction force increases rapidly and thus substantially prevents the remote operation member 130 from moving further. As a result, the operable range of the remote operation member 130 is substantially restricted to the restricted operation range RNGr.

As another example, the operable range of the remote operation member 130 may be mechanically restricted by the use of a stopper and the like.

As described above, when the first maximum operation range RNG1 is larger than the second maximum operation range RNG2, the operable range of the remote operation member 130 is restricted to the restricted operation range RNGr smaller than the first maximum operation range RNG1. As a result, an operation range in which the operation by the operator D is not reflected in the operation of the vehicle 200 is reduced. That is, a situation in which the vehicle 200 does not react to the operation by the operator D is suppressed. Therefore, a more appropriate remote operability is secured as compared with a case where the second adjustment process is not performed.

In particular, the restricted operation range RNGr (the restricted maximum operation amount MAXr) may be set such that the second operation amount OP2 corresponding to the restricted maximum operation amount MAXr is equal to the second maximum operation amount MAX2. In this case, the restricted operation range RNGr and the second maximum operation range RNG2 are associated with each other in a one-to-one manner. As a result, the operation range in which the operation by the operator D is not reflected in the operation of the vehicle 200 disappears. Therefore, a further appropriate remote operability is secured.

2-2-2. Second Example

Figure 7:
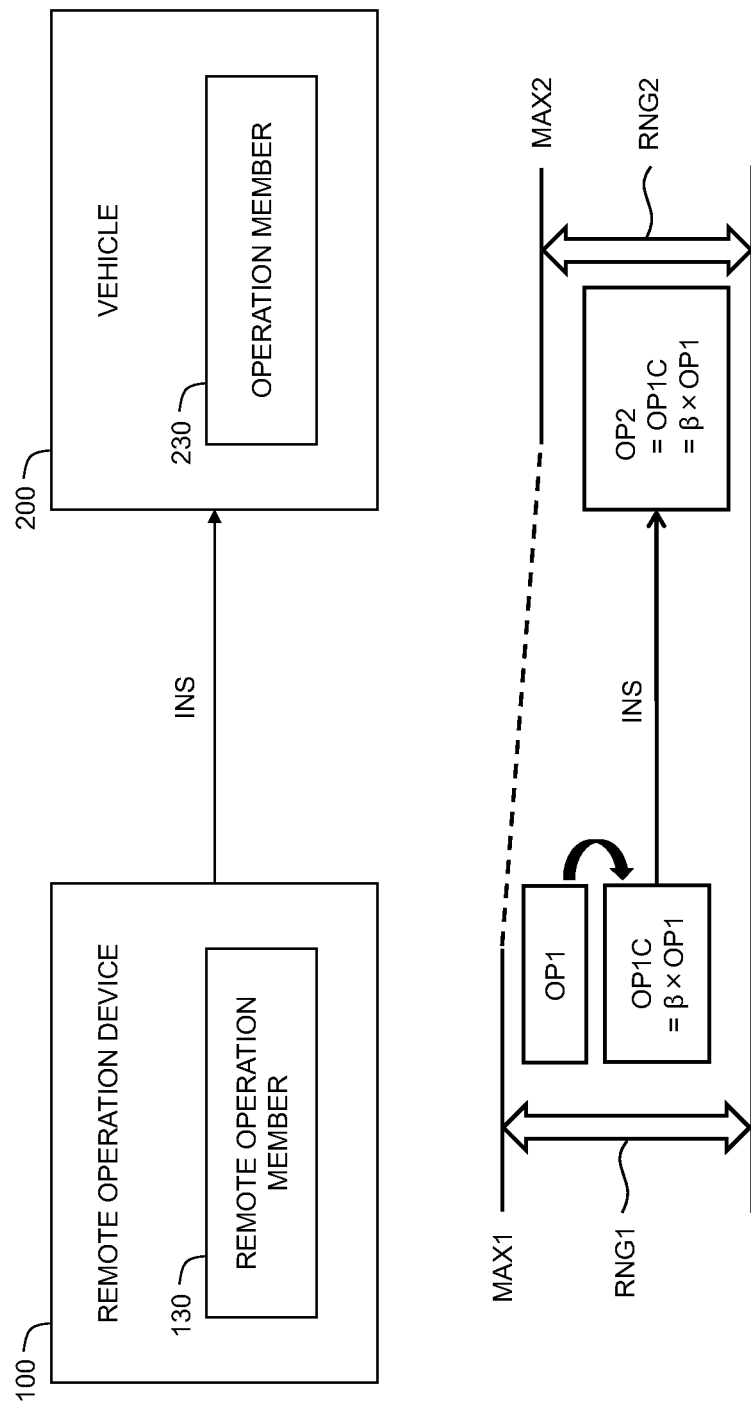
FIG. 7 is a conceptual diagram for explaining a second example of a second adjustment process according to an embodiment of the present disclosure.

FIG. 7 is a conceptual diagram for explaining a second example of the second adjustment process. The second adjustment process shown in FIG. 7 is based on the same viewpoint as the first adjustment process described in the above FIGS. 3 and 4.

More specifically, the remote operation device 100 adjusts the correspondence relationship between the first operation amount OP1 and the second operation amount OP2 such that the second operation amount OP2 becomes smaller than the first operation amount OP1. For example, the remote operation device 100 calculates the corrected first operation amount OP1C by multiplying the first operation amount OP1 of the remote operation member 130 by a correction coefficient $\beta$. The correction coefficient $\beta$ is smaller than 1 (i.e., ($\beta$<1), and the corrected first operation amount OP is smaller than the first operation amount OP1 (i.e., OP1C<OP1). The corrected first operation amount OP1C is used as the second operation amount OP2. The remote operation device 100 transmits the operation instruction information INS indicating the corrected first operation amount OP1C as the second operation amount OP2 to the vehicle 200.

When the first operation amount OP1 is the first maximum operation amount MAX1, the second operation amount OP2 may be equal to the second maximum operation amount MAX2. That is, the corresponding relationship between the first operation amount OP1 and the second operation amount OP2 may be adjusted such that the second operation amount OP2 (=$\beta$×MAX1) corresponding to the first maximum operation amount MAX1 is equal to the second maximum operation amount MAX2. In this case, the first maximum operation range RNG1 and the second maximum operation range RNG2 are associated with each other in a one-to-one manner.

The same effect as in the case of the first example shown in FIG. 5 can be also obtained by the second example shown in FIG. 7. That is, the operation range in which the operation by the operator D is not reflected in the operation of the vehicle 200 is reduced. In other words, the situation in which the vehicle 200 does not react to the operation by the operator D is suppressed. Therefore, a more appropriate remote operability is secured as compared with a case where the second adjustment process is not performed.

It should be noted that in the case of the second example shown in FIG. 7, the vehicle 200 is operated smaller even when the remote operation member 130 is largely operated. In other words, sensitivity of the vehicle 200 with respect to the operation of the remote operation member 130 is decreased. From a viewpoint of securing the sensitivity of the vehicle 200 with respect to the operation of the remote operation member 130, the first example shown in FIG. 5 may be preferable.

2-3. Effects

As described above, according to the present embodiment, when the first maximum operation range RNG1 and the second maximum operation range RNG2 do not match with each other, the operability adjustment process is performed. The operability adjustment process adjusts the remote operability according to a magnitude relation between the first maximum operation range RNG1 and the second maximum operation range RNG2. That is, the operability adjustment process flexibly adjusts the remote operability according to the type of the vehicle 200 being the target of the remote operation. It is thus possible to secure the appropriate remote operability regardless of the type of the vehicle 200.

3. Example of Vehicle 3-1. Configuration Example

Figure 8:
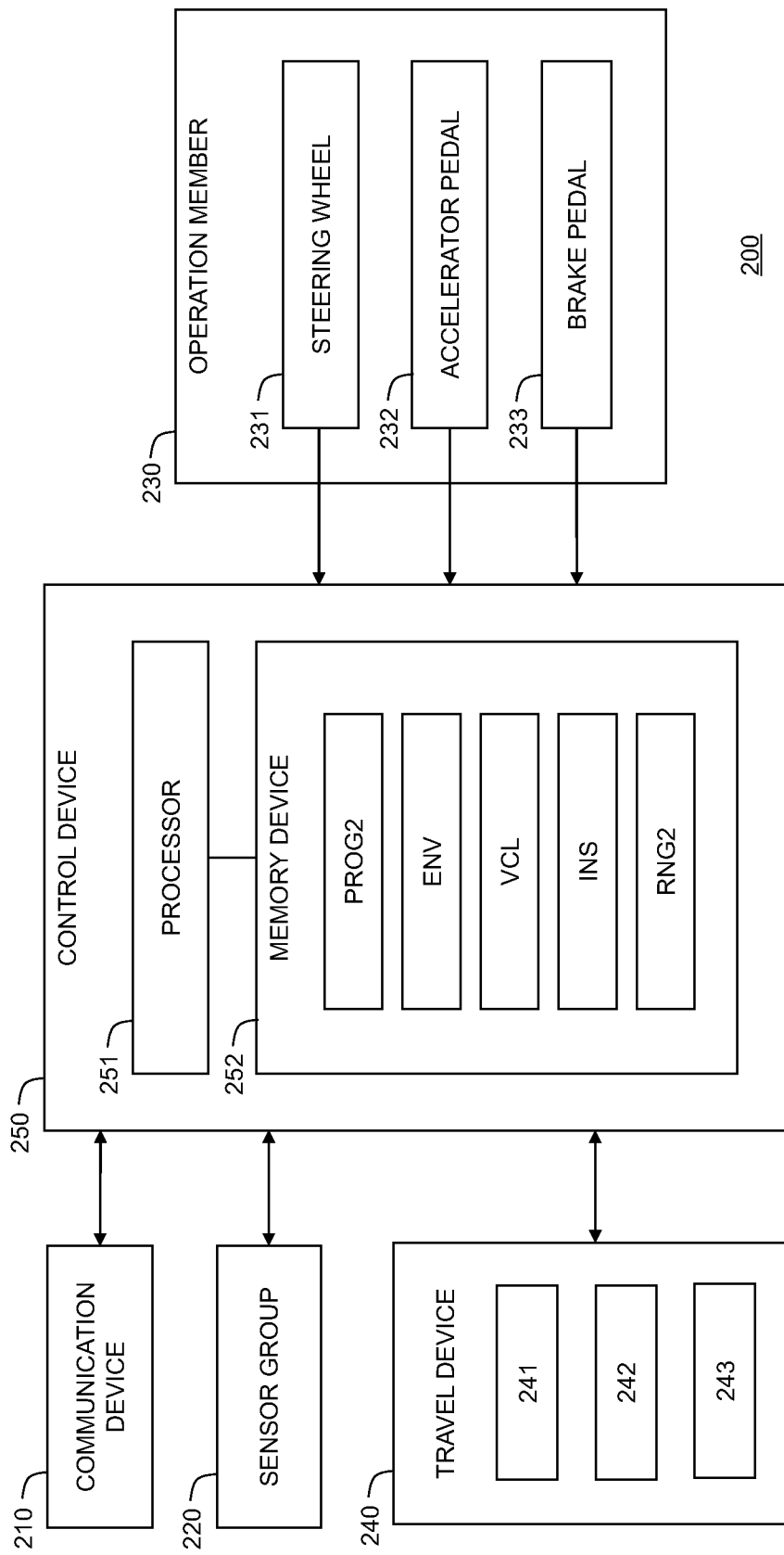
FIG. 8 is a block diagram showing a configuration example of a vehicle according to an embodiment of the present disclosure.

FIG. 8 is a block diagram showing a configuration example of the vehicle 200 according to the present embodiment. The vehicle 200 includes a communication device 210, a sensor group 220, the operation member 230, a travel device 240, and a control device 250.

The communication device 210 communicates with the outside of the vehicle 200. For example, the communication device 210 communicates with the remote operation device 100.

The sensor group 220 includes a vehicle state sensor that detects a state of vehicle 200. The vehicle state sensor includes a speed sensor, an acceleration sensor, a yaw rate sensor, a steering angle sensor, an accelerator pedal sensor, a brake pedal sensor, and the like. The sensor group 220 further includes a position sensor for detecting a position of the vehicle 200. The position sensor is exemplified by a GPS (Global Positioning System) sensor. The sensor group 220 further includes a recognition sensor for recognizing (detecting) a situation around the vehicle 200. Examples of the recognition sensor include a camera, a LIDAR (Laser Imaging Detection and Ranging), a radar, and the like.

The operation member 230 includes a steering wheel 231, an accelerator pedal 232, and a brake pedal 233.

The travel device 240 includes a steering device 241, a driving device 242, and a braking device 243. The steering device 241 steers wheels. For example, the steering device 241 includes a power steering (EPS: Electric Power Steering) device. The driving device 242 is a power source for generating a driving force. Examples of the driving device 242 include an engine, an electric motor, an in-wheel motor, and the like. The braking device 243 generates a braking force.

The control device (controller) 250 controls the vehicle 200. The control device 250 includes one or more processors 251 (hereinafter simply referred to as a processor 251) and one or more memory devices 252 (hereinafter simply referred to as a memory devices 252). The processor 251 executes a variety of processing. For example, the processor 251 includes a CPU (Central Processing Unit). The memory device (memory) 252 stores a variety of information. Examples of the memory device 252 include a volatile memory, a non-volatile memory, an HDD (Hard Disk Drive), an SSD (Solid State Drive), and the like. The control device 250 may include one or more ECUs (Electronic Control Units).

A vehicle control program PROG2 is a computer program that is executed by the processor 251. The vehicle control program PROG2 is stored in the memory device 252. As another example, the vehicle control program PROG2 may be recorded on a non-transitory computer-readable recording medium. The variety of processing by the processor 251 (the control device 250) is implemented by the processor 251 executing the vehicle control program PROG2.

3-2. Driving Environment Information

The processor 251 uses the sensor group 220 to acquire driving environment information ENV indicating a driving environment for vehicle 200. The driving environment information ENV is stored in the memory device 252. The driving environment information ENV includes vehicle state information, vehicle position information, and surrounding situation information.

The vehicle state information indicates a vehicle state detected by the vehicle state sensor. Examples of the vehicle state include a vehicle speed, an acceleration, a yaw rate, an operation amount of the operation member 230 by the driver, and the like. The operation amount of the operation member 230 includes a steering angle (steering wheel angle) of the steering wheel 231, a stroke amount of the accelerator pedal 232, and a stroke amount of the brake pedal 233.

The vehicle position information indicates the position of the vehicle 200 detected by the position sensor. The surrounding situation information indicates results of recognition by the recognition sensor. For example, the surrounding situation information includes an image captured by the camera. The surrounding situation information may include object information about objects around the vehicle 200. Examples of the objects around the vehicle 200 include a pedestrian, another vehicle (e.g., a preceding vehicle, a parked vehicle, etc.), a sign, a white line, a roadside structure, and the like. The object information indicates a relative position and a relative velocity of the object with respect to the vehicle 200.

3-3. Communication Process

The processor 251 communicates with the remote operation device 100 through the communication device 210.

For example, the processor 251 transmits a remote operation request to the remote operation device 100 through the communication device 210.

Moreover, the processor 251 transmits the vehicle information VCL to the remote operation device 100 through the communication device 210. The vehicle information VCL is used in the remote operation of the vehicle 200 by the operator D. The vehicle information VCL includes at least a part of the driving environment information ENV described above. For example, the vehicle information VCL includes the surrounding situation information. The vehicle information VCL may further include the vehicle position information. The vehicle information VCL may further include the vehicle state information.

Furthermore, the processor 251 receives the operation instruction information INS from the remote operation device 100 through the communication device 210. The operation instruction information INS is information representing the intention of remote operation by the operator D. More specifically, the operation instruction information INS indicates the second operation amount OP2 corresponding to the first operation amount OP1 of the remote operation member 130 by the operator D. The operation instruction information INS is stored in the memory device 252.

Information of the second maximum operation range RNG2 (the second maximum operation amount MAX2) of the operation member 230 of the vehicle 200 may be stored in advance in the memory device 252. The processor 251 may transmit the information of the second maximum operation range RNG2 (the second maximum operation amount MAX2) to the remote operation device 100 through the communication device 210.

3-4. Vehicle Travel Control

The processor 251 executes vehicle travel control that controls travel of the vehicle 200. The vehicle travel control includes steering control, driving control, and braking control. The processor 251 executes the vehicle travel control by controlling the travel device 240. More specifically, the processor 251 executes the steering control by controlling the steering device 241. The processor 251 executes the driving control by controlling the driving device 242. The processor 251 executes the braking control by controlling the braking device 243.

In the case of manual driving, the driver of the vehicle 200 operates the operation member 230. The processor 251 executes the vehicle travel control in accordance with the operation amount of the operation member 230 by the driver. The operation amount of the operation member 230 by the driver is included in the vehicle state information described above.

In the case of the remote operation (remote driving), the processor 251 executes the vehicle travel control in accordance with the second operation amount OP2 indicated by the operation instruction information INS received from the remote operation device 100. When the second operation amount OP2 includes a steering angle of the steering wheel, the processor 251 executes the steering control in accordance with the steering angle. When the second operation amount OP2 includes a stroke amount of the accelerator pedal, the processor 251 executes the driving control in accordance with the stroke amount. When the second operation amount OP2 includes a stroke amount of the brake pedal, the processor 251 executes the braking control in accordance with the stroke amount.

The processor 251 may execute automated driving control. More specifically, the processor 251 generates a target trajectory of the vehicle 200 based on the driving environment information ENV described above. The target trajectory includes a target position and a target velocity. Then, the processor 251 executes the vehicle travel control such that the vehicle 200 follows the target trajectory.

4. Example of Remote Operation Device 4-1. Configuration Example

Figure 9:
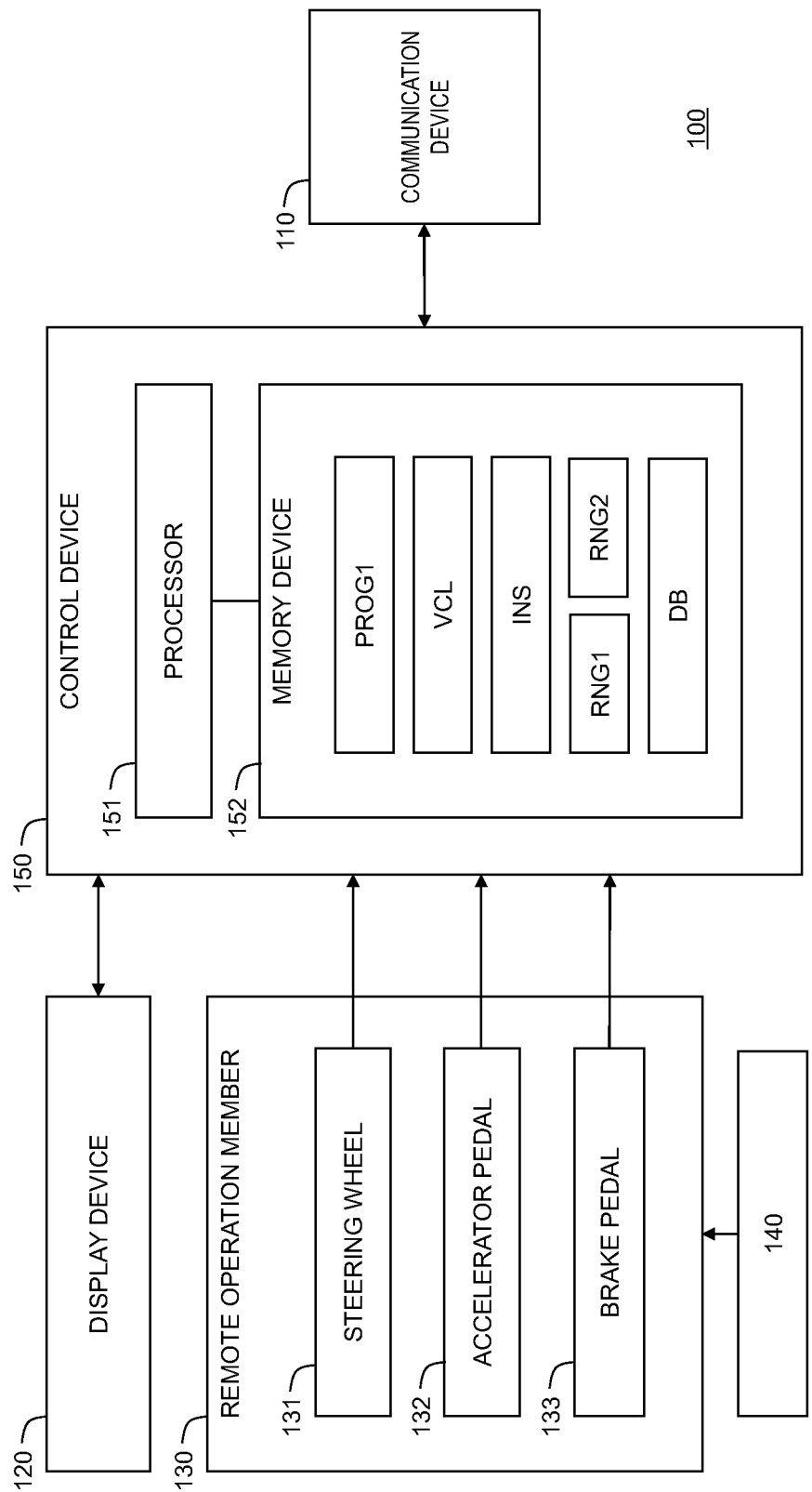
FIG. 9 is a block diagram showing a configuration example of a remote operation device according to an embodiment of the present disclosure.

FIG. 9 is a block diagram showing a configuration example of the remote operation device 100 according to the present embodiment. The remote operation device 100 includes a communication device 110, a display device 120, the remote operation member 130, a restriction mechanism 140, and a control device 150.

The communication device 110 communicates with the outside. For example, the communication device 110 communicates with the vehicle 200 being the target of the remote operation.

The display device 120 displays a variety information to present the variety of information to the operator D.

The remote operation member 130 is a member operated by the operator D when remotely operating the vehicle 200. The remote operation member 130 includes at least one of a steering wheel 131, an accelerator pedal 132, and a brake pedal 133.

The restriction mechanism 140 restricts (limits) the operable range of the remote operation member 130.

Figure 10:
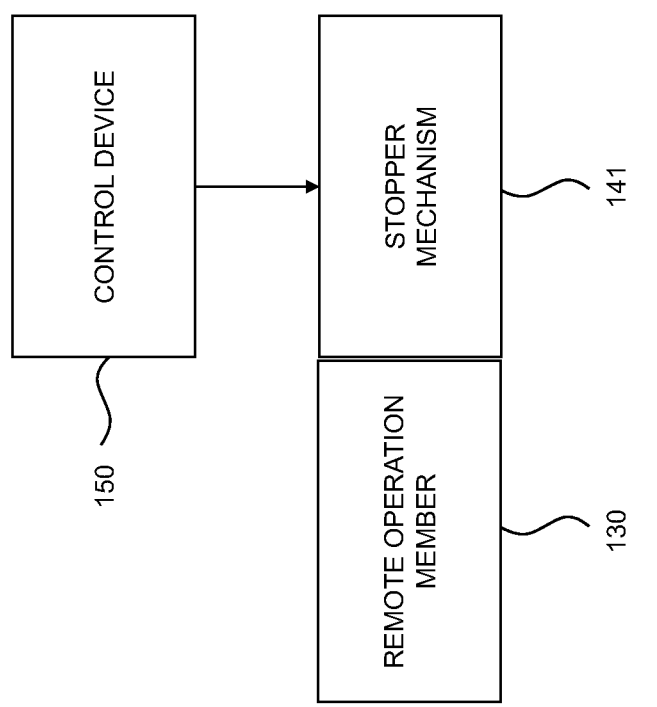
FIG. 10 is a block diagram showing an example of a restriction mechanism of a remote operation device according to an embodiment of the present disclosure.

FIG. 10 is a block diagram showing an example of the restriction mechanism 140. In the example shown in FIG. 10, the restriction mechanism 140 includes a stopper mechanism 141 that is provided together with the remote operation member 130. Using the stopper mechanism 141 to stop movement of the remote operation member 130 makes it possible to mechanically restrict (limit) the operable range of the remote operation member 130. An operation of the stopper mechanism 141 is controlled by the control device 150.

Figure 11:
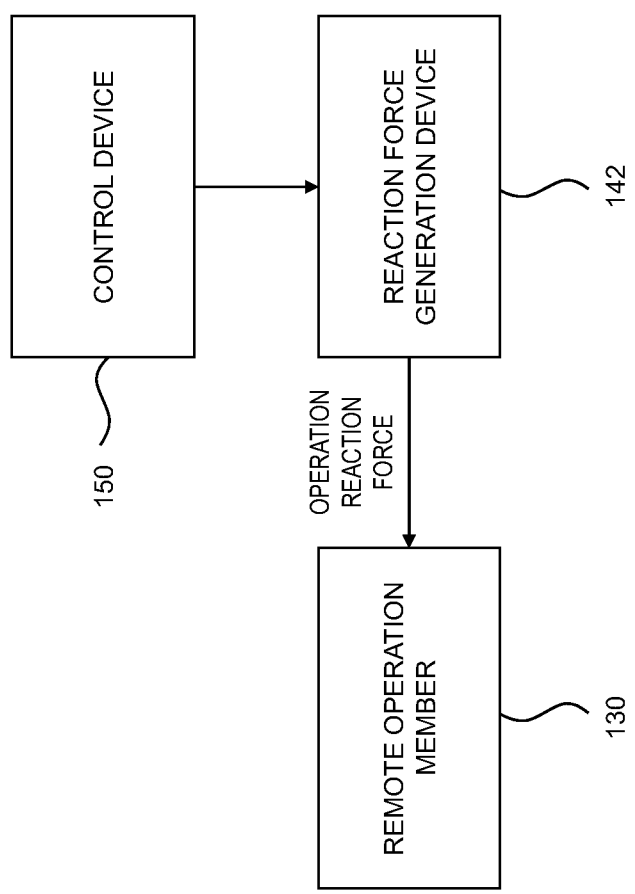
FIG. 11 is a block diagram showing another example of a restriction mechanism of a remote operation device according to an embodiment of the present disclosure.

FIG. 11 is a block diagram showing another example of the restriction mechanism 140. In the example shown in FIG. 11, the restriction mechanism 140 includes a reaction force generation device 142 that applies an operation reaction force to the remote operation member 130. For example, the reaction force generation device 142 includes a reaction force motor (reaction force actuator) that applies a reaction torque to the steering wheel 131. Actuating the reaction force motor makes it possible to apply the reaction torque to the steering wheel 131. An operation of the reaction force generation device 142 is controlled by the control device 150. Controlling the reaction force generation device 142 to apply the operation reaction force to the remote operation member 130 makes it possible to restrict (limit) the operable range of the remote operation member 130 (see FIG. 6).

The control device (controller) 150 controls the remote operation device 100. The control device 150 includes one or more processors 151 (hereinafter simply referred to as a processor 151) and one or more memory devices 152 (hereinafter simply referred to as a memory devices 152). The processor 151 executes a variety of processing. For example, the processor 151 includes a CPU. The memory device (memory) 152 stores a variety of information. Examples of the memory device 152 include a volatile memory, a non-volatile memory, an HDD, an SSD, and the like.

A remote operation program PROG1 is a computer program that is executed by the processor 151. The remote operation program PROG1 is stored in the memory device 152. As another example, the remote operation program PROG1 may be recorded on a non-transitory computer-readable recording medium. The remote operation program PROG1 may be provided via a network. The variety of processing by the processor 151 (the control device 150) is implemented by the processor 151 executing the remote operation program PROG1.

4-2. Remote Operation Processing

The processor 151 receives a remote operation request from a vehicle 200 through the communication device 110. In response to the remote operation request, the processor 151 initiates a remote operation of the vehicle 200.

The processor 151 receives the vehicle information VCL from the vehicle 200 being the target of the remote operation through the communication device 110. The vehicle information VCL is stored in the memory device 152. The processor 151 presents the vehicle information VCL to the operator D by displaying the vehicle information VCL on the display device 120. Based on the vehicle information VCL displayed on the display device 120, the operator D is able to recognize the vehicle state and the surrounding situation of the vehicle 200.

The operator D operates the remote operation member 130. The processor 151 acquires the first operation amount OP1 of the remote operation member 130 by the operator D. The first operation amount OP1 is detected by a sensor installed in the remote operation member 130. The processor 151 further generates the operation instruction information INS indicating the second operation amount OP2 corresponding to the first operation amount OP1. For example, the second operation amount OP2 is the same as the first operation amount OP1. As another example, the second operation amount OP2 may be the corrected first operation amount OP1C that is obtained by correcting the first operation amount OP1. In any case, the intention of the operator D is reflected in the operation instruction information INS. The processor 151 transmits the operation instruction information INS to the vehicle 200 through the communication device 110.

4-3. Operability Adjustment Process

The processor 151 executes the above-described operability adjustment process (see Section 2) as appropriate. For example, the processor 151 executes the operability adjustment process before the start of the remote operation of the vehicle 200.

The processor 151 acquires information of the first maximum operation range RNG1 (i.e., the first maximum operation amount MAX1) of the remote operation member 130. The information of the first maximum operation range RNG1 is stored in advance in the memory device 152. The processor 151 acquires the information of the first maximum operation range RNG1 from the memory device 152.

Moreover, the processor 151 acquires information of the second maximum operation range RNG2 (i.e., the second maximum operation amount MAX2) of the operation member 230 of the vehicle 200 being the target of the remote operation. For example, the processor 151 receives the information of the second maximum operation range RNG2 from the vehicle 200 through the communication device 110. The information of the second maximum operation range RNG2 is stored in the memory device 152.

As another example, an operation range database DB that associates the type of the vehicle 200 with the second maximum operation range RNG2 may be utilized. For example, the operation range database DB is stored in advance in the memory device 152. Alternatively, the operation range database DB may be stored in an external device that can be accessed by the processor 151. By referring to the operation range database DB, the processor 151 is able to acquire the second maximum operation range RNG2 associated with the type of the vehicle 200 being the target of the remote operation. The type of the vehicle 200 is included, for example, in the remote operation request transmitted from the vehicle 200.

Figure 12:
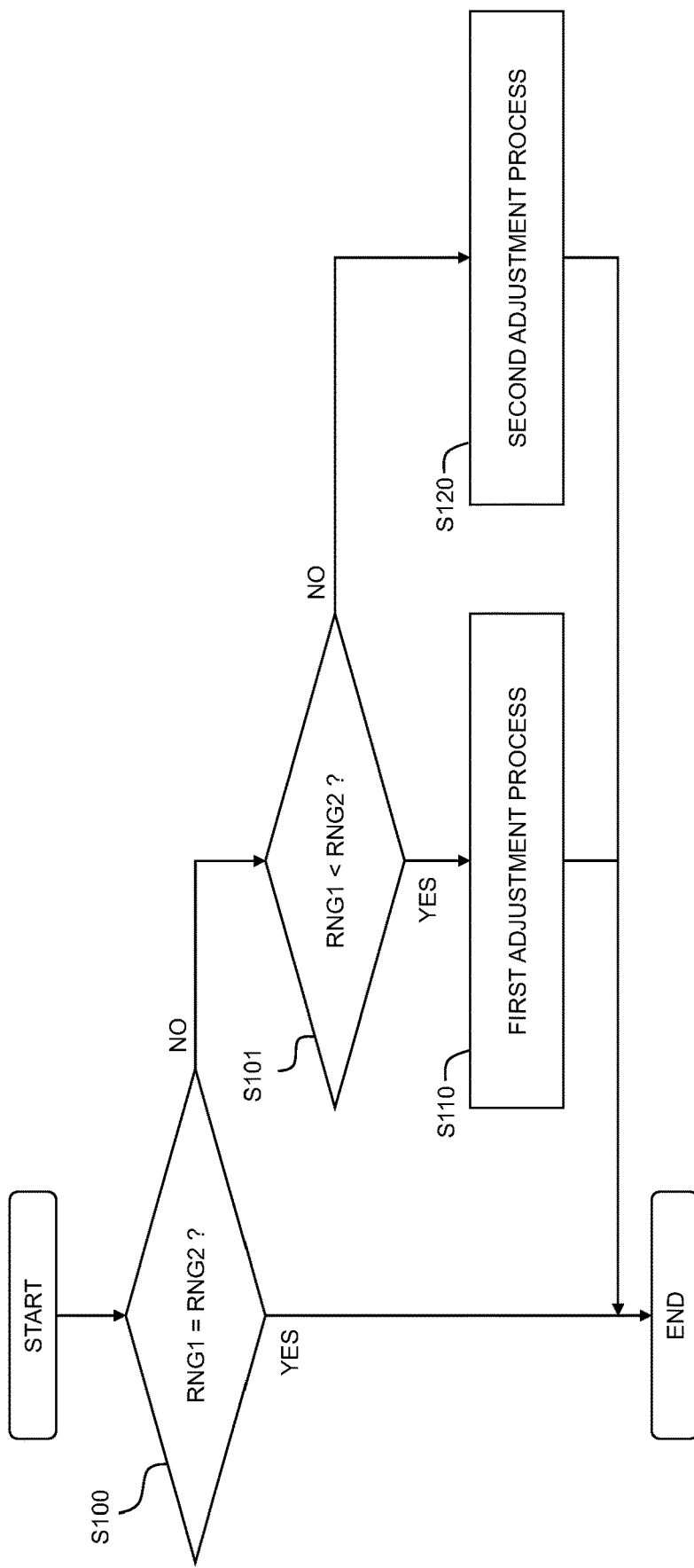
FIG. 12 is a flow chart showing an operability adjustment process according to an embodiment of the present disclosure.

FIG. 12 is a flow chart showing the operability adjustment process.

In Steps S100 and S101, the processor 151 performs a comparison process that makes a comparison between the first maximum operation range RNG1 and the second maximum operation range RNG2. When the first maximum operation range RNG1 and the second maximum operation range RNG2 are the same (Step S100; Yes), the operability adjustment process is not performed.

When the first maximum operation range RNG1 is smaller than the second maximum operation range RNG2 (Step S101; Yes), the processing proceeds to Step S110. In Step S110, the processor 151 performs the first adjustment process (see Section 2-1). More specifically, the processor 151 adjusts the correspondence relationship between the first operation amount OP1 and the second operation amount OP2 such that the second operation amount OP2 becomes larger than the first operation amount OP1.

On the other hand, when the first maximum operation range RNG1 is larger than the second maximum operation range RNG2 (Step S101; No), the processing proceeds to Step S120. In Step S120, the processor 151 performs the second adjustment process (see Section 2-2).

In the second adjustment process, the processor 151 restricts the operable range of the remote operation member 130 to the restricted operation range RNGr smaller than the first maximum operation range RNG1 (see Section 2-2-1). For example, the processor 151 mechanically restricts the operable range of the remote operation member 130 by actuating the stopper mechanism 141 (see FIG. 10). As another example, the processor 151 may restrict the operable range of the remote operation member 130 to the restricted operation range RNGr by controlling the reaction force generation device 142 to apply the operating reaction force to the remote operation member 130 (see FIGS. 6 and 11).

As another example, in the second adjustment process, the processor 151 may adjust the correspondence relationship between the first operation amount OP1 and the second operation amount OP2 such that the second operation amount OP2 becomes smaller than the first operation amount OP1 (see Section 2-2-2).

The operability adjustment process makes it possible to flexibly adjust the remote operability according to the type of the vehicle 200 being the target of the remote operation. That is, it is possible to secure the appropriate remote operability regardless of the type of the vehicle 200.

What is claimed is:

1. A remote operation method that remotely operates a vehicle in accordance with an operation of a remote operation member by an operator, wherein
    a first operation amount is an operation amount of the remote operation member by the operator,
    a first maximum operation range is a maximum operation range of the remote operation member, and
    a second maximum operation range is a maximum operation range of an operation member of the vehicle,
    the remote operation method comprising:
    operating the vehicle in accordance with a second operation amount corresponding to the first operation amount;
    based upon a determination that the first maximum operation range is not equal to the second maximum operation range,
    a first adjustment process that, when the first maximum operation range is smaller than the second maximum operation range, adjusts a correspondence relationship between the first operation amount and the second operation amount such that the second operation amount becomes larger than the first operation amount; and
    a second adjustment process that, when the first maximum operation range is larger than the second maximum operation range, adjusts the second operation amount to be in the second maximum operation range, wherein
    a first maximum operation amount is a maximum operation amount in the first maximum operation range,
    a second maximum operation amount is a maximum operation amount in the second maximum operation range, and
    the first adjustment process includes adjusting the correspondence relationship between the first operation amount and the second operation amount such that the second operation amount corresponding to the first maximum operation amount is equal to the second maximum operation amount.

2. A remote operation device that remotely operates a vehicle in accordance with an operation of a remote operation member by an operator, wherein
    a first operation amount is an operation amount of the remote operation member by the operator,
    a first maximum operation range is a maximum operation range of the remote operation member, and
    a second maximum operation range is a maximum operation range of an operation member of the vehicle,
    the remote operation device comprising one or more processors programmed to execute:
    transmitting information of a second operation amount corresponding to the first operation amount to the vehicle via communication, wherein the vehicle is operated in accordance with the second operation amount;
    based upon a determination that the first maximum operation range is not equal to the second maximum operation range,
    a first adjustment process that, when the first maximum operation range is smaller than the second maximum operation range, adjusts a correspondence relationship between the first operation amount and the second operation amount such that the second operation amount becomes larger than the first operation amount; and
    a second adjustment process that, when the first maximum operation range is larger than the second maximum operation range, adjusts the second operation amount to be in the second maximum operation range, wherein
    a first maximum operation amount is a maximum operation amount in the first maximum operation range,
    a second maximum operation amount is a maximum operation amount in the second maximum operation range, and
    the first adjustment process includes adjusting the correspondence relationship between the first operation amount and the second operation amount such that the second operation amount corresponding to the first maximum operation amount is equal to the second maximum operation amount.

* * * * *